Sept. 17, 1968   HARUHIRO KOBAYASHI   3,402,367

THREE-ELECTRODE COLD-CATHODE GAS LASER TUBE

Filed June 10, 1965

INVENTOR.
HARUHIRO KOBAYASHI
BY
OSTROLENK, FABER, GERB & SOFFEN
ATTORNEYS

United States Patent Office 3,402,367
Patented Sept. 17, 1968

3,402,367
THREE-ELECTRODE COLD-CATHODE GAS LASER TUBE
Haruhiro Kobayashi, Tokyo, Japan, assignor to Nippon Electric Company, Limited, Shiba, Minatoku, Tokyo, Japan
Filed June 10, 1965, Ser. No. 462,935
Claims priority, application Japan, June 20, 1964, 39/35,011
13 Claims. (Cl. 331—94.5)

The instant invention relates to laser devices and more particularly to a cold-cathode gas laser tube comprised of a novel three-electrode structure with the electrodes having a unique configuration to produce a laser medium having much improved gain when compared with conventional gas laser tubes and being capable of providing very efficient operation when used with relatively low voltage power sources.

In conventional gas laser tubes which are typically operated at the wavelength of light or infrared rays a plasma is typically generated within the tube structure by applying high frequency electric power from a source exterior to the tube which utilizes this power. A gas laser tube of this type is described in the Journal of the Optical Society of America, vol. 52, No. 1, January 1962, pp. 31–37. In another laser tube structure a hot cathode and an anode are mounted in such a manner as not to interfere with the effective beam of light and operate to produce a D.C. discharge with a long plasma column being generated between the anode and cathode electrodes. As another example, refer to Proceedings of the IRE, volume 50, p. 1697, July 1962.

The substance which performs laser action within the plasma is comprised of excited atoms of upper energy levels corresponding to the laser wavelengths. In order to improve the efficiency of a gas laser structure and hence increase the output power it is most important to produce the necessary excited atoms in an efficient manner. Electrons within a plasma have a Maxwellian velocity distribution such that only a very small portion of the electrons within the plasma have energies suitable for generating the above mentioned excited atoms. In addition thereto, some of the electrons excite atoms to the lower laser levels thus greatly reducing the overall gain of the structure. These observations are confirmed in Proceedings of the IEEE Correspondence, p. 1152, August 1963.

In order to provide a laser tube structure having high efficiency which is greatly improved over present day structures the instant invention contemplates the employment of a cold-cathode glow discharge wherein the energies of the electrons are raised to the values necessary to produce excited atoms of the upper laser level and also to more completely utilize those excited atoms which are diffusing from the plasma.

The instant invention is comprised of a multi-electrode laser tube structure in which a substantially cylindrical cathode member and two additional lattice-type and cylindrically shaped electrodes are all disposed in substantially concentric fashion within a suitable laser tube evacuated envelope. The cylindrical cold-cathode structure is designed to have the largest diameter with the lattice-type electrodes having increasingly smaller diameters being disposed within the cylindrical cathode. A suitable gas or gas mixture is injected into the air-tight or hermetically sealed envelope and a potential difference is applied between the cathode electrode and the lattice-type electrode which is closest thereto. This causes a glow discharge between the cylindrical cathode and the confronting lattice-type electrode. The electrons within the plasma and a fairly large amount of excited atoms diffuse through the mesh of the larger lattice-type electrode. Application of a voltage to the smallest diameter lattice-type electrode causes the diffused electrons to be accelerated toward the longitudinal axis of the tube where they collide with gas molecules to provide very efficient excitation of the molecules when the acceleration voltage is maintained at a suitable value. The resulting excited atoms together with excited atoms which have reached the region of the longitudinal axis through diffusion process, provide the laser medium. Due to the fact that there are almost no atoms in the centermost region which form lower levels a very efficient laser output is produced.

It is therefore one object of the instant invention to provide a novel gas laser tube structure.

Another object of the instant invention is to provide a novel multi-electrode structure for use in gas laser tubes and comprising a cathode-electrode and two lattice-type electrodes.

Still another object of the instant invention is to provide a novel multi-electrode structure for use in gas laser tubes and the like comprised of a substantially cylindrical cathode electrode and increasingly smaller lattice-type electrodes spaced within said cathode to produce excited atoms of the upper laser level within the centermost region of the gas laser tube.

Still another object of the instant invention is to provide a novel multi-electrode structure for use in gas laser tubes and the like comprised of a substantially cylindrical cathode electrode and increasingly smaller lattice-type electrodes spaced within said cathode to produce excited atoms of the upper laser level within the centermost region of the gas laser tube and wherein the cathode-electrode is of the cold-cathode type.

Another object of the instant invention is to provide a novel multi-electrode structure for use in gas laser tubes and the like comprised of three substantially cylindrical electrodes of increasingly diminishing diameters being arranged in concentric fashion with the outermost electrode being a cathode electrode of the cold-cathode type and the innermost electrodes being of lattice-type structure to permit electrons and excited atoms to diffuse therethrough.

Another object of the instant invention is to provide a novel multi-electrode structure for use in gas laser tubes and the like comprised of three substantially cylindrical electrodes of increasingly diminishing diameters being arranged in concentric fashion with the outermost electrode being a cathode electrode of the cold-cathode type and the innermost electrodes being of lattice-type structure to permit electrons and excited atoms to diffuse therethrough wherein the multi-electrode configuration is in alignment with the longitudinal axis of the gas laser tube.

These and other objects of the invention will become apparent when reading the accompanying description and drawing in which.

Figure 1:
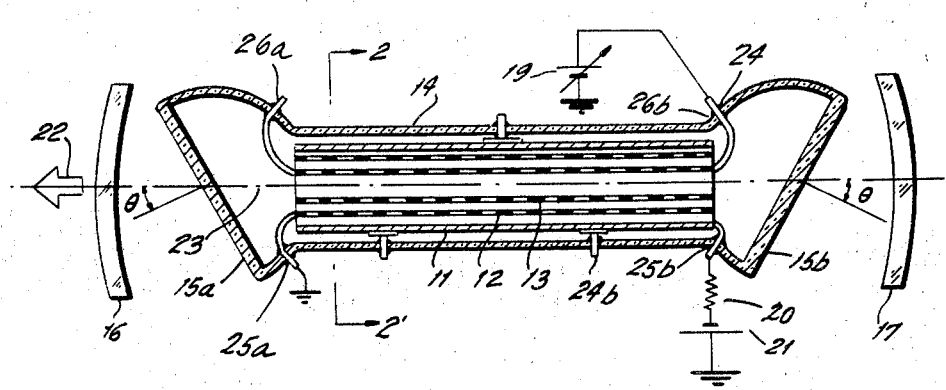
FIGURE 1 shows a sectional view of a gas laser tube designed in accordance with the principles of the instant invention.

As best shown in FIGURE 1 the gas laser apparatus 10 is comprised of a substantially cylindrical metallic electrode 11, preferably formed of tantalum or molybdenum and, in the preferred embodiment, having an interior diameter of 15 mm. and a length of 20 cm. Electrode 11 operates as the cold-cathode electrode of the apparatus 10. The cold-cathode electrode 11, as well as the lattice-type electrodes 12 and 13 are so arranged that their longitudinal axes coincide with the longitudinal axis 23 of the tube envelope 14. The substantially cylindrical lattice-type electrodes 12 and 13 preferably have diameters of 8 mm.

and 6 mm., respectively, with their lengths being substantially equal to the length of cold-cathode electrode 11. As can clearly be seen electrodes 11–13 are arranged in concentric fashion and are spaced apart from one another. Electrodes 11–13 are rigidly mounted within an evacuated envelope 14 by the supporting means 24a–24b through 26a–26b, respectively, with all the supporting means being sealed airtight to the envelope 14.

Envelope 14 may be formed of glass or any other suitable material and subsequent to evacuation is filled with a suitable gas such as, for example, a mixture of helium and neon gases of selected amounts so as to form a predetermined ratio within the tube.

The opposite ends 15a and 15b of envelope 14 are formed of a transparent material suitable for laser light. The ends 15a and 15b are highly polished and angularly disposed in such a manner that a line normal to the surface of the plate window maintains Brewster's polarization angle A with respect to the longitudinal axis 23 of the cylindrical cathode. The polarization angle is determined by the equation $\tan A = n$. In this equation $n$ represents the index of refraction of the glass plate for the particular wavelength of laser lights.

A pair of reflectors 16 and 17, respectively, are arranged at the outer ends of the laser tube structure, as shown in FIGURE 1, with the reflective characteristics of the reflector members for the tube of the laser light being 99% and 100%, respectively.

Figure 2:
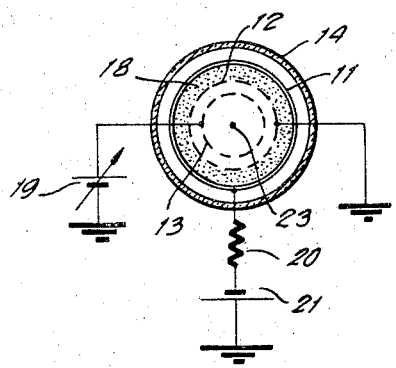
FIGURE 2 shows a sectional view taken along the line 2—2' of FIGURE 1.

As is shown in FIGURE 2 a glow discharge 18 is produced by coupling the negative terminal of electric power source 21 to cathode electrode 11 through resistance element 20 while the lattice-type electrode 12 is electrically grounded. The energy levels of the electrons within the plasma are reduced as they approach the lattice-type electrode 12 and a substantially large amount of electrons pass to the interior region of electrode 12 by diffusing through the meshes thereof.

A positive electric potential 19 having the value of approximately 20 volts is applied to the lattice-type electrode 13 in the manner shown in the figures causing the electrons which have diffused through lattice-type electrode 12 to be accelerated to the value of potential source 19. The electrons move toward the centralmost portion of the laser tube, diffusing through the meshes of electrode 13 and colliding with a large number of helium atoms causing excitation thereof.

The glow discharge plasma 18 also generates a large number of excited atoms of helium and a substantially large amount of these excited atoms move toward the tube longitudinal axis 23 by diffusion through the meshes of electrodes 12 and 13. These excited helium atoms transfer their energies to neon atoms realizing a population inversion and the cooperative relationship of the reflector members 16 and 17 act to produce a powerful laser output in the direction shown by arrow 22.

By controlling the value of positive bias voltage source 19, it is possible to selectively generate excited atoms having energy levels of $2^1S$ or $2^3S$ of helium. Helium atoms of these energy levels act to produce neon atoms having energy levels of 3S and 2S, respectively, thus making it possible to obtain output power having a wavelength of 0.6328 or 1.153 microns, respectively, when employing reflector members 16 and 17 having the reflective characteristics described above. Thus, by employing reflector members which are matched for the output wavelengths and by adjusting the value of voltage source 19 it is possible to provide a laser device having substantially improved efficiency when compared with conventional devices by obtaining a laser output which is most suitable to the desired wavelength.

Due to the close spacing between cathode electrode 11 and first lattice-type electrode 12, which spacing in the preferred embodiment is only 3.5 mm., the discharge maintaining voltage may be kept at quite a low level. This permits use of an electric power source 21 which need develop a potential difference of substantially only 200 volts. The structure of the instant invention therefore differs from conventional laser devices in that it does not require either a high frequency power supply or a high voltage D.C. electric power source. The employment of a cold-cathode structure completely avoids the need for a separate heater electric power source. Since the plasma generated is contained within the interior of cathode-electrode 11 the tube envelope 14 need not be made of quartz and can easily be made of ordinary glass thereby greatly reducing the production cost of the laser device.

While the above described exemplary embodiment teaches the use of a D.C. electric power source it should be understood that the instant invention is also well suited for pulse operation and further, while the exemplary embodiment teaches the use of substantially cylindrical electrode members it should be understood that any other suitable shape such as rectangular, hexagonal, or any other polygonal or multi-sided configuration may be employed.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A gas laser tube structure for generating a laser output comprising an
   elongated evacuated envelope containing a gas mixture suitable for producing a glow discharge;
   an elongated hollow first electrode positioned within said envelope; the longitudinal axes of said envelope and said first electrode being substantially in alignment;
   a second elongated lattice-type electrode positioned within said first electrode;
   bias means coupled between said first and second electrodes for generating a glow discharge therebetween;
   a third lattice-type electrode positioned within said second electrode;
   second bias means coupled to said third electrode for accelerating electrons diffusing through said second electrode toward said envelope longitudinal axis;
   said electrons being diffused through said third electrode to generate a large amount of excited atoms thereby producing powerful laser output.

2. A gas laser tube structure for use in producing a laser output comprising an evacuated envelope containing a gas mixture suitable for producing a glow discharge;
   a first hollow elongated electrode having its longitudinal axis substantially in alignment with the envelope axis;
   a second hollow electrode positioned within said first electrode;
   bias means for initiating a glow discharge between said first and second electrodes;
   said second electrode being a mesh-like arrangement to enable excited atoms and other charged particles to diffuse therethrough;
   a third electrode positioned within said second electrode;
   bias means for accelerating appropriately charged particles diffusing through said second electrode toward said third electrode;
   said third electrode being a mesh-like arrangement to enable said accelerated particles to diffuse through said third electrode toward said envelope axis to generate a laser output.

3. The device of claim 1 wherein the first and second ends of said envelope are each comprised of a polished glass window having an index or refraction N; a line normal to the surface of each window forming an angle A with the envelope axis where A is defined as $\tan A = N$.

4. The device of claim 3 wherein said gas laser apparatus is further comprised of first and second reflectors positioned adjacent said envelope first and second ends, respectively.

5. The device of claim 3 wherein said gas laser apparatus is further comprised of first and second reflectors positioned adjacent said envelope first and second ends, respectively, the reflection characteristics being 99% and 100%, respectively, at the selected wavelength of laser output.

6. The device of claim 1 wherein the first and second ends of said envelope are each comprised of a lens having an index or refraction N; a line normal to the surface of each lens forming an angle A with the envelope axis where A is defined as tan $A=N$.

7. The gas laser apparatus of claim 2 wherein said first, second and third electrodes all have similar shaped cross-sections.

8. The gas laser apparatus of claim 2 wherein said first, second and third electrodes all have similar shaped polygonal cross-sections.

9. The gas laser apparatus of claim 2 wherein said first, second and third electrodes all have similar shaped circular cross-sections, said electrodes being arranged in concentric fashion.

10. The gas laser apparatus of claim 2 wherein said envelope is charged with a mixture of neon and helium of a predetermined weight and ratio.

11. The gas laser apparatus of claim 2 wherein said first electrode comprises the cathode electrode of said tube and is of the cold-cathode type.

12. The gas laser apparatus of claim 2 wherein said first electrode comprises the cathode electrode of said tube and is of the cold-cathode type, said cathode being made of a metal taken from the group comprising tantalum and molybdenum.

13. The apparatus of claim 9 wherein said first, second and third electrodes have radii of 7.5, 4 and 3 millimeters, respectively, wherein these spacings permit effective operation while using low voltage biasing means.

References Cited

UNITED STATES PATENTS

| | | | |
|---|---|---|---|
| 3,314,021 | 4/1967 | Haun et al. | 331—94.5 |
| 3,321,714 | 5/1967 | Tien | 331—94.5 |
| 3,363,196 | 1/1968 | Eknayan | 331—94.5 |

JEWELL H. PEDERSEN, *Primary Examiner.*

W. L. SIKES, *Assistant Examiner.*